May 3, 1966  L. F. BEACH  3,248,952
GYROSCOPES
Filed Jan. 24, 1951
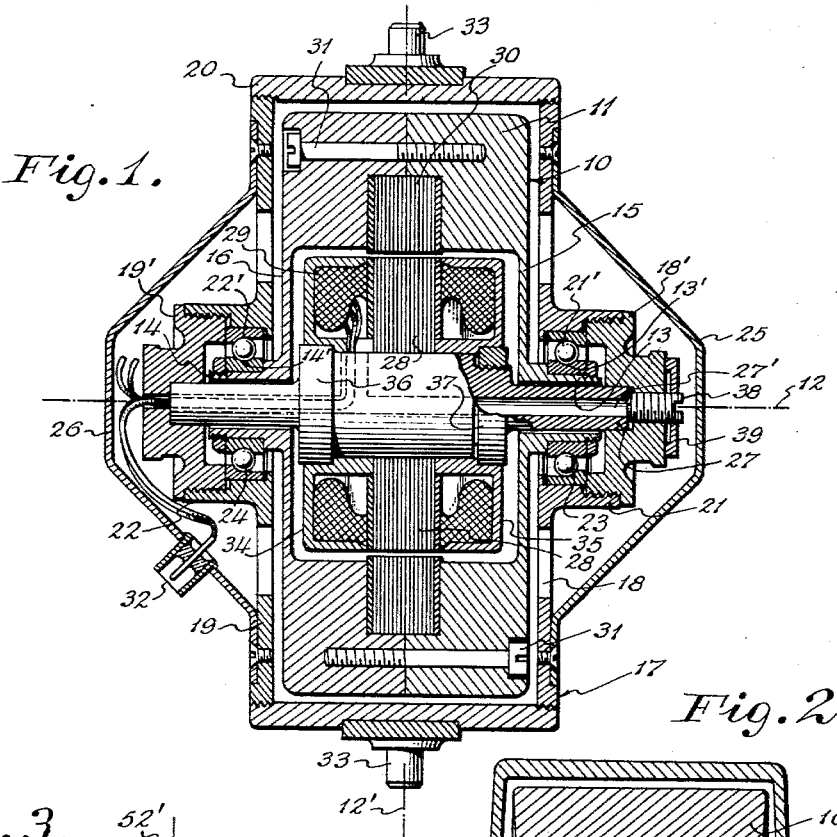
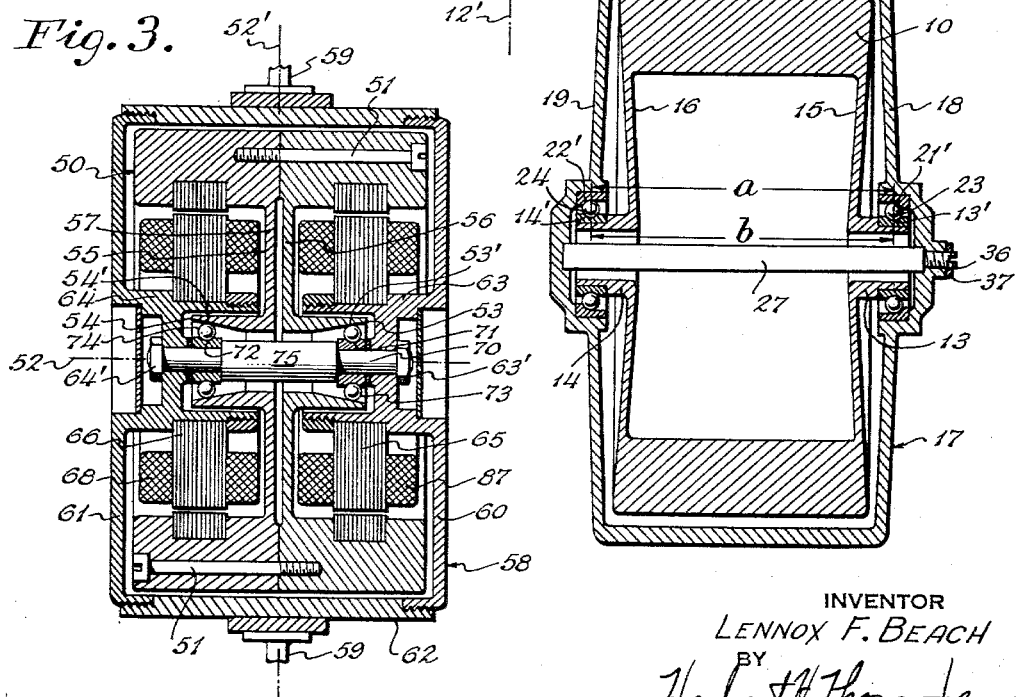
INVENTOR
LENNOX F. BEACH
BY
Herbert H. Thompson
his ATTORNEY.

United States Patent Office
3,248,952
Patented May 3, 1966

3,248,952
GYROSCOPES
Lennox F. Beach, Sea Cliff, N.Y., assignor to Sperry Rand Corporation, a corporation of Delaware
Filed Jan. 24, 1951, Ser. No. 207,567
3 Claims. (Cl. 74—5)

My invention relates generally to gyroscopes and has reference more particularly to improvements in the construction of a gyro rotor and its supporting gimbal frame or rotor case.

It is well known that the requirements for a high performance gyroscope reside principally in a high angular momentum of the gyro rotor and also in the fixity of balance of the rotor and rotor case or rotor bearing frame about its supporting or pivot axis. The former is obtained by high speed and good distribution of mass of the rotor about its spin axis; and the latter by the symmetrical construction of both the rotor and its supporting frame or rotor bearing frame about the pivot or tilt axis. The improvements in the gyroscope of my invention relate to symmetry of design, and fixity of balance, under all operating conditions and adaptations of the rotor to operate at a very high speed.

In the gyroscope of my invention, temperature differentials produced by heating of the stator of the driving motor for the rotor will not affect the fixity of balance about the supporting or tilt axis of the rotor bearing frame. Also, temperature differentials which will exist in the gyroscope of my invention will affect neither the distribution of mass about the pivot axis nor the loading of the bearings which support the rotor within the rotor bearing frame due to the flexible or elastic nature of the walls of the rotor. Furthermore, unavoidable wear and seating of the rotor within its supporting bearings will not produce any bearing end play due to the novel configuration of the rotor.

The principal object of my invention, therefore, is to provide a gyroscope of novel construction whereby a predetermined initial bearing load is provided in the direction of the rotor axis, the load being substantially maintained during operation of the gyroscope notwithstanding tendencies of temperature differentials and bearing wear within the gyroscope adversely to affect such load and disturb the fixity of balance of the instrument.

With the foregoing and other objects in view, my invention includes the novel elements and the combinations and arrangements thereof described below and illustrated in the accompanying drawings, in which FIG. 1 is a horizontal sectional view of the gyro rotor and its supporting case or rotor-bearing frame;

FIG. 2 is a generally schematic illustration of the rotor and rotor bearing frame;

FIG. 3 illustrates a modified form of the gyro rotor and its supporting frame.

Referring particularly to FIG. 1, there is shown a gyro rotor 10 having a massive peripheral portion 11 radially spaced from the axis of rotation 12 thereof. A pair of oppositely disposed, hollow hub portions 13 and 14 which support suitable bearing races having raceways or bearing surfaces 13' and 14' thereon, are provided for supporting the rotor 10 for rotation about the spin axis 12. In the embodiment of the invention herein illustrated, the end walls of the rotor 10 are machined down to form relatively thin, end wall portions 15 and 16 which are elastically deformable in the direction of the rotor spin axis 12, and which extend radially from the spin axis 12 and connect the hollow hub portions 13 and 14 with the massive peripheral rotor portion 11. The function of the elastically deformable end walls 15 and 16 will be hereinafter more fully described.

The rotor 10 is made in two halves, as illustrated, having the squirrel cage 30 of the driving motor for the rotor clamped therebetween by suitable clamping screws 31. In order to provide symmetrical distribution of mass of the rotor about the axis of support or tilt axis 12' of the rotor bearing frame, the screws 31 are distributed evenly around the rotor, half of the screws entering the rotor frame from one side and half from the other side.

The rotor bearing frame, generally indicated at 17, is provided for supporting the rotor for rotation about the spin axis 12 while it, in turn, may be supported for tilt about a tilt axis 12' in suitable bearings (not shown) by oppositely disposed pins 33. The frame, generally, comprises a pair of spaced wall portions 18 and 19 of a thickness which provides slight elasticity in the direction of spin axis 12 and which are connected as by suitable threaded connections to a cylindrical outer ring 20. The side wall portions 18 and 19 are provided with central hubs 21 and 22 which support suitable bearing rings or bearing races having raceways or bearing surfaces 21' and 22' thereon. The bearing members or balls 23, 24 cooperate with the raceways 13', 14' and 21', 22' and together form an anti-friction support for the rotor 10. The bearing races containing raceways 21', 22' are suitably clamped within the hubs 21 and 22 by suitable end caps 18' and 19'. In the embodiment of my invention herein illustrated, the casing or rotor bearing frame 17 is adapted to be evacuated so that it may spin with very high velocity without causing undesirable windage. For this purpose, a pair of relatively thin caps 25, 26 are provided. However, it is to be clearly understood that the principles of my invention may be applied to a gyroscope in which the rotor bearing frame is open or comprises just a ring having suitable rotor bearings mounted therein.

As described and claimed in my U.S. Letters Patent No. 2,353,139, dated July 11, 1944, I provide a compression strut 27, which extends along the spin axis 12 and through the hollow hub portions 13 and 14, the ends thereof terminating and abutting against suitable recesses in the end caps 18' and 19' fixed to the hub portions 21 and 22. The strut 27 may be keyed to the end caps so that it cannot twist or rotate therewithin. The strut member 27 serves to control the separation between the bearing surfaces 21' and 22' on the hubs 21 and 22. The strut member 27 also supports the stator 28 of the driving motor for the rotor 10. The strut 27 may be suitably bored as at 27' for conducting the electrical leads from the stator windings 29 to suitable air-sealed electrical plugs 32. As above indicated, the rotor bearing frame disclosed in the illustrated embodiment of my invention is adapted to be completely evacuated so that the rotor spins in a vacuum. The use of compression strut 27 in the evacuated frame 17 is of great importance as it resists the load imposed by the air pressure on the caps 25 and 26 and transferred to the housing end walls 18 and 19, and maintains the correct bearing adjustment when the casing 17 is pumped out or evacuated. As will be pointed out below, the strut 27 being of symmetrical construction divides the heat flow from the stator 28, 29 evenly and, at the same time, dimensional changes thereof are disposed equally about the median plane of the gyro, thereby maintaining balanced fixity about the pivot axis 12'.

In evacuated rotor-bearing cases, such as that herein described, the difficulty of maintaining a high vacuum has in the past been complicated by the presence of vapors or gases which are given off by the cementing and impregnating compounds used in binding the windings of the rotor. This objectional presence of vapors within the casing has in the past been overcome by omitting the cement or impregnating compounds and the stator windings have been supported or held together by means of strings or cords tied about the coils. But this method is not completely secure and the windings tend to shift their position, in some cases sufficiently to rub against the rotor. This is extremely undesirable in the gyroscope of my invention since such shifting of the relatively heavy stator windings will produce undesired unbalance of the gyroscope about the tilt axis 12'. I have overcome this tendency of unimpregnated windings to shift by surrounding the windings with suitable cup-shaped clamping members 34 and 35, which members are clamped in position on the strut 27 by means of suitable shoulders on the clamping members which abut shoulder 36 and clamping nut 37 on the strut 27. With such an arrangement of winding clamping members, cementing and impregnating compounds need not be employed and obviously the string binding is unnecessary.

In accordance with the teachings of my invention I maintain a predetermined bearing load with differential temperature changes in the assembly and with wear in the following manner, reference being made to FIGS. 1 and 2 of the drawings. The axial distance between the bearing surfaces 21', 22' on the rotor bearing frame 17 may be adjusted by adjusting the effective length of the strut member 27 as by means of a suitable adjusting screw 38 and associated clamping nut 39. On assembly, the adjusting screw 38 is rotated so as to elastically deform the casing sidewalls 18 and 19 outwardly (see FIG. 2) so as to place the strut 27 under compression Thus, slight axial dimensional changes in either direction of the strut member due to changes in temperature will be exactly followed by the hub members 21 and 22 which carry the raceways 21' and 22'. The final adjustment of the length of the strut 27 is such that the dimension "a" between the bearing surfaces 21', 22' is different than the dimension "b" between the bearing surfaces 13', 14' on the rotor hub portions 13 and 14 before assembly of the rotor 10 within the frame 17. In the illustrated embodiment of my invention, the difference in the axial positioning of the bearing surfaces 21', 22' of the rotor bearing frame 17 is slightly less than the distances between the bearing surfaces 13', 14' on the rotor hub portions 13, 14 before the assembly of the rotor within the frame. Therefore, upon assembling the rotor 10 within the rotor bearing frame 17, the elastically deformable end wall portions 15, 16 of the rotor 10 will be slightly deformed inwardly, i.e., towards the stator 28, the resulting spring action of the rotor side walls thereby providing a predetermined preloading of the bearing members 23 and 24. The elastically deformable diaphragm-like end walls 15, 16 of the rotor 10 have a comparatively high spring rate (on the order of approximately 10 pounds per .001 of an inch deflection total) and it has been found that with such a spring rate the preloading of the bearings 23 and 24 will be approximately 20 pounds. Thus, unavoidable wear and seating of the bearings plus temperature differentials produced during the starting and running periods of the gyroscope of my invention will be completely compensated due to the spring characteristics of the rotor frame sidewalls 18 and 19 and the rotor end walls 15, 16.

Various methods have heretofore been employed to preload the bearing members of gyro rotors. For example, one method was to provide one or a pair of axially extending coil springs around the rotor bearing shaft which served to force the inner bearing races against the balls of the bearing. This method could not be successfully employed in a gyroscope having critical fixity of balance about the tilt axis thereof because the rotor, on tilt of the gyroscope, would shift its position axially against the resiliency of the springs; that is, the rotor would have substantial and undesirable end play. Furthermore, sliding of the inner races of the bearing members along the rotor bearing shaft would produce undesirable friction. Also, it is extremely difficult, if not impossible, to construct two or more coil springs having exactly the same spring rate. However, in the gyroscope of my invention I have provided a predetermined preload on the rotor bearings while maintaining fixity of balance about the median plane of the gyroscope, by providing two exactly symmetrical springs acting without the friction and axial end play inherent with the above-described coil spring construction. The elastically deformable end walls 15 and 16 of the rotor 10 constitute spring members which may be easily constructed by machining and polishing so that they both have exactly the same spring rate.

The self compensation provided by the gyroscope of my invention may be better understood by stating what occurs during the starting period and during the running period. During the starting period, the strut becomes very hot due to large starting currents in the stator windings 29. Such a high temperature change will cause the strut 27 to expand before other elements of the gyroscope expand thereby causing the side walls 18 and 19 of the rotor bearing frame 17 to be forced outwardly along the spin axis 12. This causes an increase in the dimension "a" of FIG. 2 and reduces the bearing load on the bearing members 23, 24 slightly. However, the reduction of bearing load is very small because the spring characteristics of the rotor end walls 15 and 16 will cause the dimension "b" to closely follow the increase in the dimension "a". Some time after the rotor has come up to speed and goes into the running period, heat balance will be achieved. The heat generated by the stator windings 29 will be dissipated into the walls 18, 19 and cylindrical portion 20 of the gyro rotor frame and also the massive peripheral portion 11 of the rotor 10 will absorb some of the heat. Thus, the peripheral portion 11 will expand in a direction parallel to the spin axis 12 thereby reestablishing the initial inward deformation of the rotor side walls 15 and 16 and consequently reestablishing the initial load on the bearing members 23 and 24. Slight wear of the bearing surfaces will be compensated for in the same way, i.e., the change in either of the dimensions "a" or "b" being absorbed by the spring characteristics of the rotor end walls.

Referring now to FIG. 3 of the drawings, I have illustrated a modified form of gyro rotor and supporting case therefor which also embodies the principles of my invention. In this modification, the rotor 50 comprises a massive peripheral portion 51 radially displaced from its spin axis 52. A pair of oppositely disposed hollow hub portions 53 and 54 having internal bearing races 53', 54' are provided for supporting rotor 50 for rotation about the spin axis 52. In the modification illustrated in FIG. 3, the hub portions 53 and 54 are connected to the peripheral rotor mass 51 by a radially extending web portion 55. The web portion 55 is bifurcated thereby forming a pair of substantially flexible, diaphragm-like connecting portions 56, 57 between the rotor hubs 53, 54, respectively and the massive peripheral rotor portion 51. The diaphragm-like connecting portions 56 and 57 perform the same function as the thin elastically deformable wall portions 15 and 16 of the rotor 10 of FIG. 1 i.e., will maintain a substantially constant bearing load with dimensional changes brought about with changing temperature conditions and under slight changes in dimensions caused by wear.

The rotor bearing frame of the gyroscope of FIG. 3, generally indicated at 58, is provided for supporting the rotor 50 for rotation about the spin axis 52, while it in turn may be supported for tilt about a tilt axis 52' in suitable bearings (not shown) by oppositely disposed pins 59. The frame comprises generally a pair of spaced wall portions 60, 61 which are slightly flexible along spin axis 52 and which are connected by a cylindrical outer ring 62, as by suitable threaded connections. The wall portions 60, 61 are provided with internally extending hub portions 63, 64, each of which supports respective stators 65, 66 having suitable windings 87, 68 for driving the rotor 50. These stators are arranged within the casing 58 so that the connecting web 55 of the gyro rotor extends radially between them.

As in the gyroscope of FIG. 1, I provide a strut 70, which extends along a spin axis 52 and through the hollow hub portions 53 and 54 of the gyro rotor 50 and has the ends thereof fixed as by suitable nuts 63', 64' to the internally extending hub portions 63, 64. The strut member 70 serves to support the races 71, 72 of a pair of bearing members 73 and 74, which bearing members cooperate with the bearing surfaces on the hub portions 53 and 54 of the rotor 50.

It will be noted that the strut 70 is formed with an enlarged central portion 75, the shoulders formed thereby serving to hold the bearing races 71, 72 in firm position against the hub portions 63, 64. The raised portion 75 of strut 70 also serves to control the axial spacing between the races 71 and 72 just as the strut 27 of FIG. 1. As in FIG. 1, before assembly of the rotor 50 within the frame 58 the axial dimension between bearing surfaces 71, 72 on the frame 58 is different than the axial dimension between the bearing surfaces 53', 54' on the rotor hub portions 53, 54. Thus, when the rotor is assembled within the case or frame 58, the diaphragm-like portions 56, 57 will be deflected towards each other in a direction parallel to spin axis 52, thereby providing an axial stress between the bearing surfaces 53', 54', which in turn provide a predetermined initial load on the bearing members 73, 74.

From the above description, it will be apparent that any changes in the axial dimension between bearing races 71, 72 on the frame 58 will be closely followed by a corresponding change in the axial dimension between the bearing races 53', 54' on the rotor hubs 53, 54 due to the elasticity in diaphragm-like portions 56, 57 of the rotor web portion 55, thereby substantially maintaining the predetermined bearing load.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscope, a casing having resilient end-walls, a rotor wheel having both a rim portion and a dual hub portion interconnected by a plurality of diaphragm-like members also having resiliency, spaced bearing elements respectively supported by said end-walls for supporting the rotor wheel in said casing for rotation about an axis, the diaphragm-like members of the rotor being resiliently deformed inwardly by said bearing elements on assembly of the rotor in said casing to effect a predetermined axial loading on said elements, and means for spacing said bearing elements a predetermined initial amount, said last recited means including a strut member extending through said bearing elements along said axis and having its ends respectively supported in said end-walls, whereby, as the strut member longitudinally expands, said end-walls resiliently yield outwardly and the diaphragm-like members of the rotor exert a decreasing-axial loading on said bearing elements.

2. In a gyroscope, a rotor casing having resilient end-walls, a rotor wheel having a rim portion and a pair of oppositely disposed hub portions, resilient diaphragm-like members interconnecting the respective rotor hub portions and said rim portion at both ends of said rotor, a pair of oppositely disposed bearing-retaining rings for supporting the respective hub portions for rotation about an axis, each ring comprising an inner race positioned on the respective hub portions and an outer race mounted to abut the respective end-walls of said casing, said hub portions on assembly thereof in said casing being urged toward each other against the resiliency of the diaphragm-like members in order to make the spacing between the respective inner races substantially equal to the spacing between the respective outer races and thereby axially load the bearings retained by said rings, and means for spacing said outer races a predetermined distance apart on said assembly, said last recited means including a strut member extending through the bearing rings along said axis and having ends respectively abutting said end-walls, whereby on longitudinal expansion of the strut member said end-walls resiliently yield outwardly carrying said hub portions therewith while the resiliency of said diaphragm-like members of the rotor, against which resiliency said hub portions were urged toward each other on assembly, remains sufficient to maintain some axial loading on said bearings.

3. In a gyroscope, a rotor casing having longitudinally resilient end-walls; a rotor wheel having a massive peripheral portion and a pair of oppositely disposed hollow hub portions, each having an outwardly tapering inner surface; a pair of closely-spaced diaphragm-like members extending from a mid zone of said peripheral portion and connecting said portion with the respective hub portions, said members also being longitudinally resilient and adapted to be resiliently deformed inwardly on assembly of the gyroscope, bearing means for supporting said rotor wheel for rotation in said casing about an axis, said means being axially loaded by said diaphragm-like members and comprising a pair of spaced inner raceways in affixed relation to said end-walls, a pair of outer raceways, and a plurality of bearing elements cooperatively associated with the respective inner and outer raceways, said outer raceways being formed by the tapering inner surfaces of said hub portions; means for spacing the inner raceways a given distance apart on assembly of the gyroscope and for mounting said raceways in affixed relation to said casing end-walls, said last recited means including a strut member extending from end-wall to end-wall along said axis and passing through said inner raceways, whereby said given spacing determines a resilient deformation of said diaphragm-like members which results in an axial loading on said bearing means which diminishes to a predetermined minimum value on maximum longitudinal expansion of said strut member.

References Cited by the Examiner

UNITED STATES PATENTS

| 2,091,888 | 8/1937 | Schmidt | 74—5 |
| 2,353,139 | 7/1944 | Beach | 308—230 |
| 2,410,002 | 10/1946 | Bach | 74—5 X |

FOREIGN PATENTS

| 251,389 | 4/1926 | Great Britain. |

BROUGHTON G. DURHAM, *Primary Examiner.*

SAMUEL SPINTMAN, ARTHUR M. HORTON, SAMUEL BOYD, *Examiners.*